UNITED STATES PATENT OFFICE.

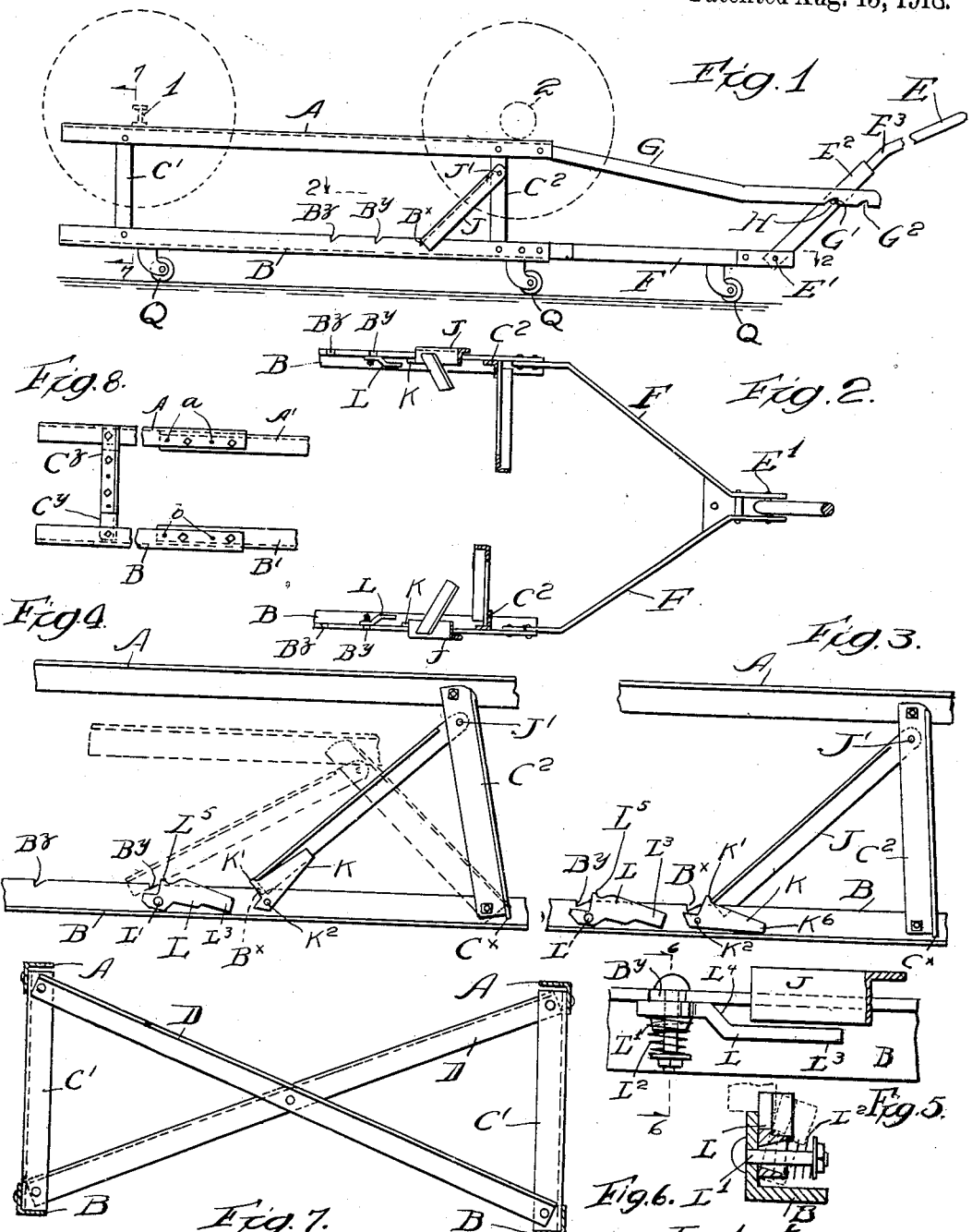

HARRY J. BUTLER, VALENTINE J. STEVENS, AND MICHAEL D. WALSH, OF MAPLE PARK, ILLINOIS.

VEHICLE-JACK.

1,275,381.   Specification of Letters Patent.   Patented Aug. 13, 1918.

Application filed November 19, 1915. Serial No. 62,319.

*To all whom it may concern:*

Be it known that we, HARRY J. BUTLER, VALENTINE J. STEVENS, and MICHAEL D. WALSH, citizens of the United States, and residents of Maple Park, in the county of Kane and State of Illinois, have invented new and useful Improvements in Vehicle-Jacks, of which the following is a specification, reference being had to the accompanying drawings, forming a part thereof.

The purpose of this invention is to provide a vehicle jack of simple construction adapted for lifting the vehicle bodily off the ground. It is particularly intended for use under vehicles shod with pneumatic tires in which it is desirable to relieve the tires from load when the vehicle is left standing for any considerable length of time. The invention consists of the features and elements described and shown in the drawings as indicated by the claims.

In the drawings:—

Figure 1 is a side elevation of the jack embodying this invention.

Fig. 2 is a partial plan view taken as a section at the line 2—2 on Fig. 1.

Fig. 3 is a detail view showing the pawl in position preparatory to release.

Fig. 4 is a similar detail view showing the trip device in operation.

Fig. 5 is a detail plan view of the trip L.

Fig. 6 is a section taken as indicated at line 6—6 on Fig. 5.

Fig. 7 is a vertical section showing the transverse bracing for the posts.

Fig. 8 is a detail view of a modification showing means for adjusting the jack to various heights and lengths of vehicles.

The jack illustrated in the drawings consists of parallel top rails, A, parallel bottom rails, B, and corner posts, $C^1$ and $C^2$, connecting said rails in pairs. The corner posts are pivotally joined both to the bottom rails, B, and the top rails, A, so that each of the two vertically disposed quadrilateral frames thus formed may be collapsed by folding of the posts, $C^1$ and $C^2$, down against the bottom rails, B, whereby the top rails, A, are lowered toward said bottom rails. The said two quadrilateral frames are rigidly joined together by diagonal braces, D, connecting the corner posts in pairs.

From Fig. 1 it will be understood that for supporting a vehicle the device is positioned under the vehicle so that the axles, 1 and 2, may rest upon the top rails, A. The jack is placed in position with said top rails, A, more or less collapsed toward the bottom rails, B, and is brought into operative relation with the vehicle for supporting the latter by swinging the posts, $C^1$ and $C^2$, to the approximately vertical position in which they are illustrated in Fig. 1. This is accomplished through a hand lever, E, which is shown fulcrumed at $E^1$, between the converging frame members, F, which extend from the bottom rails, B, at one end. Two similar members, G, pivotally connected to the ends of the top rails, A, constitute a yoke which is coupled to the hand lever, E, by engagement of the notches, $G^1$, with a cross pin, H, in the lever. Thus it will be clear that by swinging the lever, E, in a direction away from the device the top rails, A, will be raised from the position shown in dotted lines in Fig. 4 to the full-line position of said figure, and in such movement will pick up the vehicle by its axles, 1 and 2.

As a single swing of the lever, E, would be insufficient to complete this movement, the yoke members, G, G, (one on each rail, A, only one appearing in the drawings) are provided with additional notches, $G^2$, and pawl members, J, are pivoted at $J^1$, to the posts, $C^2$, with their lower ends arranged to engage stop notches, $B^x$, $B^y$ and $B^z$, in the rails, B. The pawl is engaged in the notch, $B^z$, at a partly collapsed position of the rails, A, at which the device can be introduced under the axles of the vehicle supported by its wheels on the ground, and the outward swing of the lever, E, lifting the rails, A, takes the wheels off the ground, draws the pawl back from the notch along the top edge of the rail, B, and it drops successively into the other notches, $B^y$ and $B^x$. Thus after the first swing of the lever, E, the top rails, A, will be retained in their partially elevated position by engagement of the pawls, J, in the notches, $B^y$, while the lever, E, is being swung back to disengage its pin, H, from the notches, $G^1$, and to engage it in the notches, $G^2$. In a device of the proportions shown a second swing of the lever will be sufficient to bring the posts, $C^1$ and $C^2$, to the approximately vertical position at which they are retained by the pawls, J, lodging in the notches, $B^x$.

Pivotally secured to the inner side of each of the rails, B, there is shown a trip device, K, which has a projection, K¹, extending slightly above the upper edge of the rail, B, just back of the sloping side of the notch, Bˣ. To lower the top rails, A, and to replace the vehicle upon the floor or ground the lever, E, is first swung away from the device far enough from its former position to drag the pawls, J, out of the notches, Bˣ, and over the projections, K¹, of the trip devices, K. Then as the load on the rails, A, is allowed to carry the pawls, J, forward, their ends are forced to travel in circular arcs concentric with the fulcrum pivots, K², of the trips, K, so that, as will be seen from Fig. 4, they are lifted over the notches, Bˣ, without being stopped therein and are allowed to slide forward on the top edges of the rails, B. It is deemed preferable to arrest the downward movement of the load by engagement of the pawls, J, in the notches, Bʸ, and to permit this the second pair of trips, L, are loosely fulcrumed on pivots, L¹, and held in contact with the rails, B, by coiled springs, L², on said pivots. The tail portions, L³, of these trips are bent laterally away from the rails, B, so that the upper edges of the pawls, J, will encounter the slanting portions, L⁴, of the trips as they approach from the trips, K, and will tip the trips, L, upon the pivot studs, L¹, on which they are pivoted loosely by the vertical elongation of the pivot aperture, particularly at the inner side, as indicated in Fig. 6, or will thrust them laterally along said pivots in opposition to the springs, L², so as to pass without engaging the projections, L⁵, of the trips, L, and slide directly into the notches, Bʸ. After the passage of the pawls, J, the trips, L, will return to their normal position, illustrated in Fig. 5, ready to engage the pawls, J, when the latter are drawn back over the projections, L⁵, whereupon they will operate similarly to the trips, K, to carry the pawls, J, over the notches, Bʸ, and on to the top edges of the rails, B, along which they may slide into the notches, Bᶻ. It may be understood that the longer end portions, K⁶ and L⁶, of the trip devices serve as counterweights operating yieldingly to retract the trips to their normal position; and that these ends also operate as stops engaging the bottom flanges of the rails, B, to limit such retraction of the trip devices and to determine their initial position.

As indicated in the drawings, the jack may be very conveniently constructed of angle steel; with this material the notches Bˣ, Bʸ and Bᶻ, are formed in the vertical flange of the angle, while the other flange extends below such notches and toward the center of the frame. The vertical flanges of the pawls, J, are then disposed adjacent to the vertical flanges of rails, B, and just outside them, with the other flanges extending inwardly for engagement with the notches, Bˣ, Bʸ and Bᶻ. As indicated in Figs. 3 and 4, the posts, C², are stopped in their upright position by encounter of their extended transverse flanges, Cˣ, with the bottom flanges of the rails, B.

Preferably the device should be mounted upon caster wheels, Q, so that it may be used for shifting vehicles about in a garage without the trouble of starting their engines and lowering them to their own wheels. For the sake of compactness it is preferable that the handle portion, E³, of the lever, E, be removable from a socket in the stub portion, E².

In Fig. 8 there is shown a simple expedient for adapting the device to vehicles of different lengths and axle heights. This expedient consists in providing the longitudinal rails, A and B, with extension pieces, A¹ and B¹, fixed to the main rails, A and B, and having a plurality of bolt holes, $a$, $a$, and $b$, $b$, in excess of the number of bolts used, the holes being equally spaced apart so that the bolt holes on the extension pieces may be matched at different positions with the bolt holes of the main parts for varying the amount of extension. Similarly, to vary the height the corner posts, C¹ and C², may be made each of two interlapped angle iron members, Cʸ, and Cᶻ, bolted together, and each provided with a plurality of bolt holes in excess of the number of bolts used equally spaced apart to provide for adjusting the lap of the two members to vary the operative length of the posts.

We claim:—

1. A jack for the purpose indicated, comprising a base, parallel posts pivoted thereon, rails pivotally connecting the upper ends of said posts, means for swinging the posts to approximately upright position, a pawl pivoted to one of the posts, the base being provided with an abutment for engagement by said pawl when the posts have been moved toward upright position, a trip device positioned to be encountered by the pawl on the continuance of said movement beyond the point at which the pawl engages said abutment, said trip device being adapted on the subsequent return of the pawl to deflect the latter clear of the abutment on the base rail.

2. A jack for the purpose indicated, comprising a base, parallel posts pivoted thereon, rails pivotally connecting the upper ends of said posts, means for swinging said posts toward upright position, a pawl pivoted to one of said posts, the base being provided with an abutment for engagement by said pawl when the posts have been moved to approach upright position, a pivoted trip device having an abutment over which the pawl is drawn by the continuance of said movement and with which abutment the pawl becomes engaged on its subsequent return movement when the posts are lowered, said engagement causing the trip to swing about its pivot to carry the pawl clear of the abutment of the base.

3. A jack for the purpose indicated, comprising a base, parallel posts pivoted thereon, rails pivotally connecting the upper ends of said posts, means for swinging the posts to approximately upright position, a pawl pivotally connected with the moving parts, the base having an abutment with which the pawl engages in the movement of said parts toward upright position of the posts, a pivoted trip having means for engagement by the pawl in the reverse movement of the latter and having its pivot positioned for causing it when so engaged by the pawl to swing through an arc for carrying the pawl clear of the abutment on the base in said reverse movement.

4. A jack for the purpose indicated, comprising a base, parallel posts pivoted thereon, rails pivotally connecting the upper ends of said posts; means for swinging the posts toward upright position; a pawl pivoted to one of the posts, the base being provided with an abutment for engagement by said pawl to support the rails in elevated position, and a trip device positioned to engage and support the end of the pawl when the latter is drawn beyond said abutment, said trip device being pivoted to carry the end of the pawl in an arc clear of said abutment when the pawl is allowed to move in reverse direction, said trip being mounted to yield laterally, and having a slanted side adapted to engage the side of the pawl as the latter approaches the abutment.

5. A jack for the purpose indicated, comprising a base, parallel posts pivoted thereon, rails pivotally connecting the upper ends of said posts; means for swinging the posts toward upright position; a pawl pivoted to one of the posts, the base being provided with an abutment for engagement by said pawl to support the rails in elevated position, and a trip device positioned to engage and support the end of the pawl when the latter is drawn beyond said abutment, said trip device being pivoted to carry the end of the pawl in an arc clear of said abutment when the pawl is allowed to move in reverse direction, the pivot aperture of said trip device being vertically elongated, and said trip having a slanted side positioned to engage the side of the pawl as the latter approaches the abutment, whereby said trip device may tip laterally out of the path of the pawl, together with yielding means adapted for restoring said trip device to its normal position.

6. A jack for the purpose indicated, comprising a base, parallel posts pivoted thereon, rails pivotally connecting the upper ends of said posts; means for swinging the posts toward upright position; a pawl pivoted to one of said posts, the base being provided with an abutment for engagement by said pawl to hold the rails in elevated position, and a trip device positioned to be engaged by the pawl when the latter is drawn beyond the abutment on the base, said trip device being pivoted and adapted to yield rotatively about its pivot to carry said engaged end of the pawl in an arc clear of said abutment when the pawl is allowed to move in reverse direction.

In testimony whereof we have hereunto set our hands at Maple Park, Illinois, this 9th day of November, 1915.

HARRY J. BUTLER.
VALENTINE J. STEVENS.
MICHAEL D. WALSH.

Witnesses:
HARRY KENYON,
CHARLES KEANAN.